(12) United States Patent
Bidichandani et al.

(10) Patent No.: US 8,559,943 B2
(45) Date of Patent: Oct. 15, 2013

(54) ACKNOWLEDGING RECEIPT OF REAL-TIME DATA

(75) Inventors: Sameer Bidichandani, Mountain View, CA (US); Paramesh Gopi, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 1175 days.

(21) Appl. No.: 12/474,153

(22) Filed: May 28, 2009

(65) Prior Publication Data

US 2009/0232082 A1    Sep. 17, 2009

Related U.S. Application Data

(62) Division of application No. 10/960,378, filed on Oct. 6, 2004, now Pat. No. 7,558,289.

(60) Provisional application No. 60/581,040, filed on Jun. 17, 2004.

(51) Int. Cl.
*H04W 4/00* (2009.01)

(52) U.S. Cl.
USPC ........ 455/432.2; 709/203; 709/226; 709/229; 370/229; 370/252; 370/285; 370/461; 370/464

(58) Field of Classification Search
USPC ........ 455/424, 425, 456.5, 456.6, 561, 550.1, 455/575.1, 435.2, 435.1, 412.1, 161.3, 455/426.1, 422.1, 63.4; 370/461, 464, 474, 370/252, 329, 285, 229, 338, 448, 477; 709/203, 226, 229
See application file for complete search history.

(56) References Cited

U.S. PATENT DOCUMENTS

| | | | |
|---|---|---|---|
| 6,205,129 B1 | 3/2001 | Esteves et al. | |
| 6,259,898 B1 | 7/2001 | Lewis | |
| 6,674,738 B1 * | 1/2004 | Yildiz et al. | 370/338 |
| 6,882,635 B2 * | 4/2005 | Eitan et al. | 370/338 |
| 6,947,431 B1 | 9/2005 | Bergeron et al. | |
| 6,954,450 B2 | 10/2005 | Krischer et al. | |
| 7,212,511 B2 | 5/2007 | Jonsson et al. | |
| 7,302,634 B2 * | 11/2007 | Lucovsky et al. | 715/200 |
| 7,363,246 B1 * | 4/2008 | Van Horn et al. | 705/80 |
| 7,376,143 B2 * | 5/2008 | Liu | 370/448 |
| 7,483,984 B1 * | 1/2009 | Jonker et al. | 709/226 |

(Continued)

FOREIGN PATENT DOCUMENTS

JP    2005-012725    1/2005

OTHER PUBLICATIONS

"Information technology—Telecommunications and information exchange between systems—Local and metropolitan area networks—Specific requirements- Part 11: Wireless LAN Medium Access Control (MAC) and Physical Layer (PHY) specifications", IEEE Std 802.11, 1999.

(Continued)

*Primary Examiner* — Hai V Nguyen

(57) ABSTRACT

In one aspect, a method for communicating with a wireless communication system through a wireless client includes associating a wireless client with a wireless communication system; at the wireless client, receiving one or more real time data packets transmitted from the wireless communication system, each real time data packet containing real time data; and sending an acknowledgement (ACK) packet for each real time data packet correctly received by the wireless client.

20 Claims, 5 Drawing Sheets

(56) References Cited

U.S. PATENT DOCUMENTS

| | | | |
|---|---|---|---|
| 7,558,289 B1* | 7/2009 | Bidichandani et al. | 370/474 |
| 8,054,798 B2* | 11/2011 | Jeong et al. | 370/331 |
| 2002/0064164 A1 | 5/2002 | Barany et al. | |
| 2002/0073234 A1 | 6/2002 | Ma | |
| 2003/0061365 A1* | 3/2003 | White et al. | 709/229 |
| 2003/0067872 A1* | 4/2003 | Harrell et al. | 370/229 |
| 2003/0128690 A1 | 7/2003 | Elliott et al. | |
| 2003/0198191 A1* | 10/2003 | Hsiao | 370/254 |
| 2003/0214905 A1* | 11/2003 | Solomon et al. | 370/229 |
| 2003/0223381 A1* | 12/2003 | Schroderus | 370/285 |
| 2004/0066756 A1 | 4/2004 | Ahmavaara et al. | |
| 2004/0072573 A1 | 4/2004 | Shvodian | |
| 2004/0100924 A1 | 5/2004 | Yam | |
| 2004/0192284 A1* | 9/2004 | Vaisanen et al. | 455/422.1 |
| 2004/0196871 A1* | 10/2004 | Terry | 370/477 |
| 2004/0224637 A1* | 11/2004 | Silva et al. | 455/63.4 |
| 2004/0255008 A1 | 12/2004 | Olsen et al. | |
| 2005/0021781 A1* | 1/2005 | Sunder et al. | 709/229 |
| 2005/0041588 A1 | 2/2005 | Kim et al. | |
| 2005/0070279 A1 | 3/2005 | Ginzburg et al. | |
| 2005/0100056 A1 | 5/2005 | Chuberre et al. | |
| 2005/0128998 A1 | 6/2005 | Jelitto et al. | |
| 2005/0276247 A1 | 12/2005 | Heiman et al. | |
| 2006/0009213 A1* | 1/2006 | Sturniolo et al. | 455/426.1 |
| 2006/0116127 A1 | 6/2006 | Wilhoite et al. | |
| 2006/0123079 A1* | 6/2006 | Sturniolo et al. | 709/203 |
| 2006/0126581 A1 | 6/2006 | Katsumata et al. | |
| 2006/0227801 A1 | 10/2006 | Nanda et al. | |
| 2007/0091806 A1 | 4/2007 | Miyamoto | |
| 2007/0153788 A1 | 7/2007 | Yi et al. | |
| 2007/0249386 A1* | 10/2007 | Bennett | 455/550.1 |
| 2008/0056201 A1* | 3/2008 | Bennett | 370/334 |
| 2009/0232082 A1* | 9/2009 | Bidichandani et al. | 370/329 |
| 2012/0134291 A1* | 5/2012 | Raleigh | 370/252 |

OTHER PUBLICATIONS

"Part 11: Wireless LAN Medium Access Control (MAC) and Physical Layer (PHY) specifications: Higher-Speed Physical Layer Extension in the 2.4 GHz Band", IEEE Std 802.11a, 1999.

"Part II: Wireless LAN Medium Access Control (MAC) and Physical Layer (PHY) specifications: Higher-Speed Physical Layer Extension in the 2.4 GHz Band", IEEE Std. 802.11b, 1999.

"Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band", IEEE 802.11g, 2003.

"TGn Sync Proposal Technical Specification", IEEE Std. 802.11n, 2005.

"*System Requirements for IEEE 802.20 Mobile Broadband Wireless Access Systems—Version 14*", IEEE Standards Working Group 802.20, Jul. 16, 2004, vol. 16, 23 pages.

"*Part 16: Air Interface for Fixed Broadband Wireless Access Systems*", IEEE 802.16, IEEE Standard for Local and Metropolitan Area Networks, Oct. 1, 2004, 896 pages.

* cited by examiner

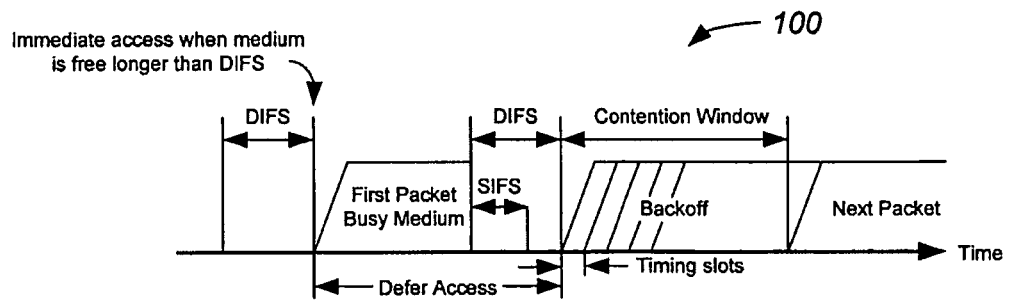
FIG. _1
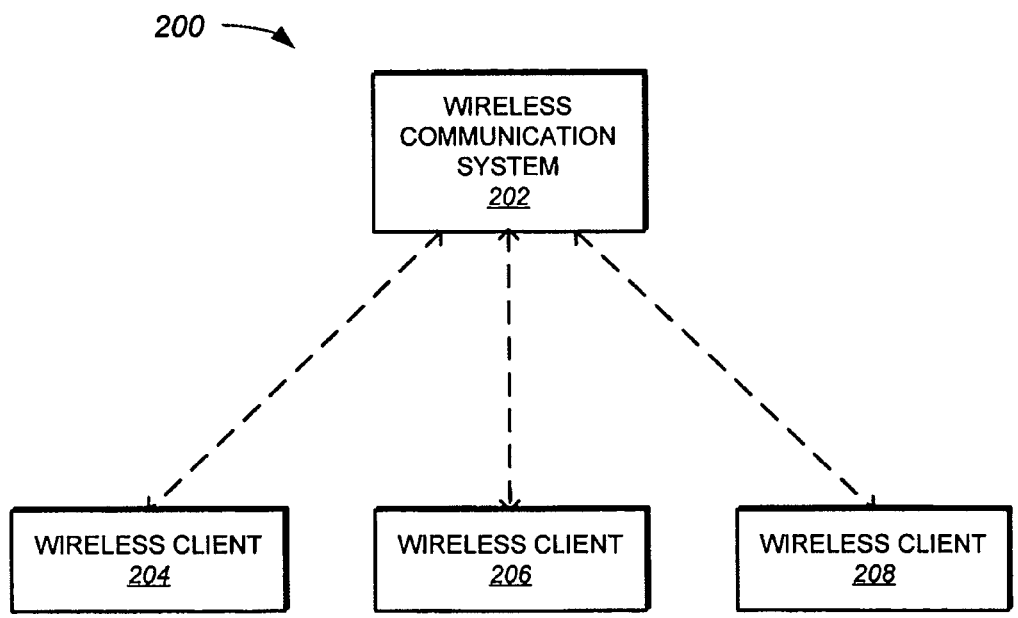
FIG. _2

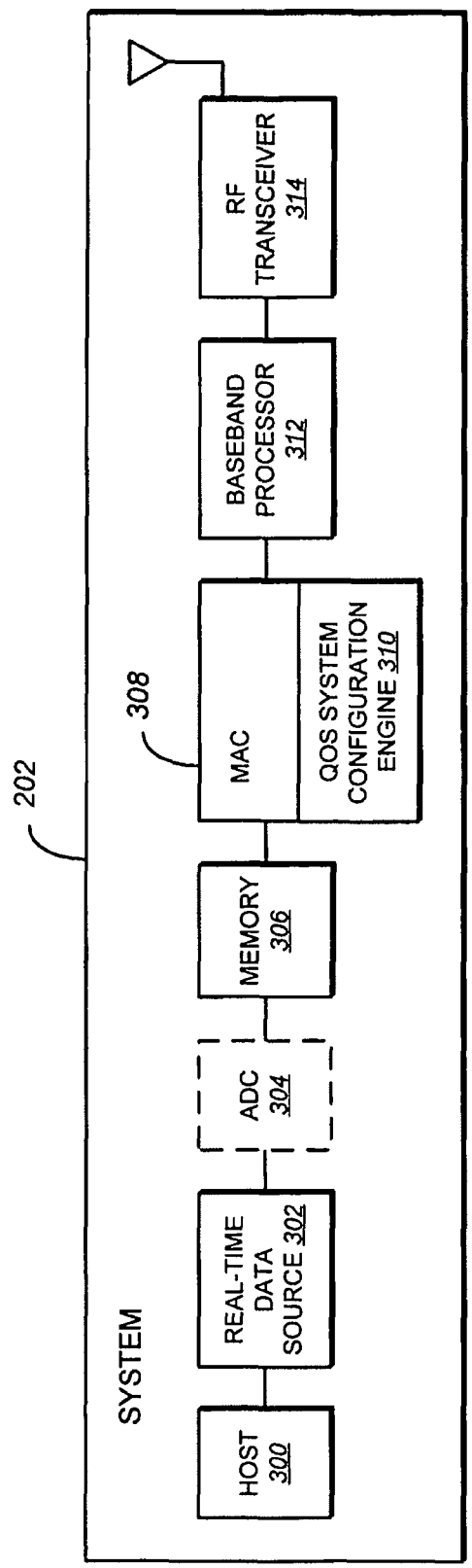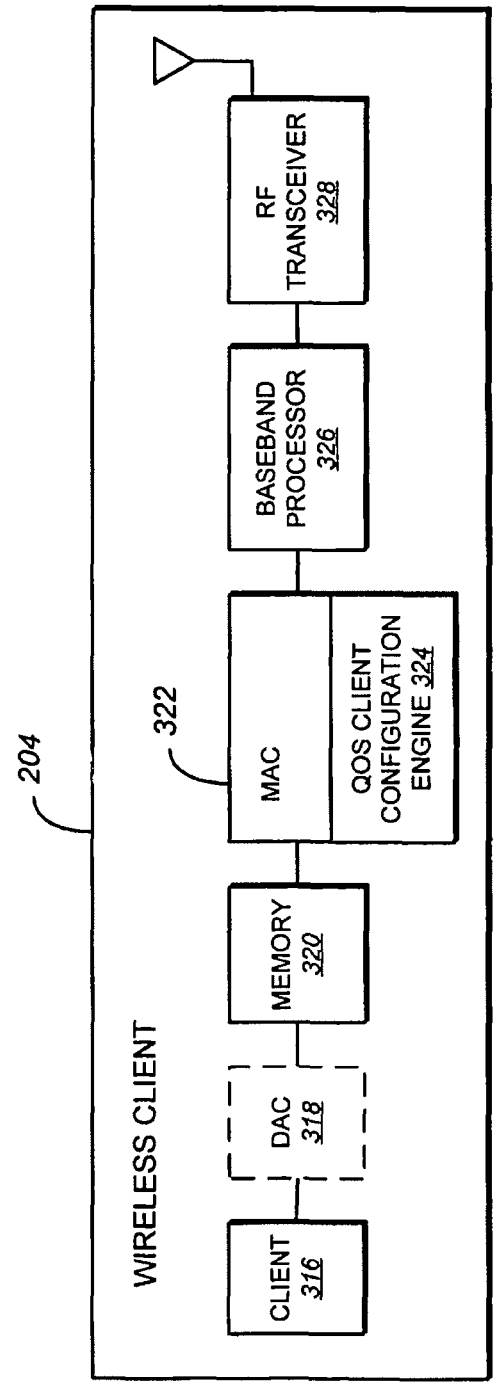
FIG. _ 3A
FIG. _ 3B

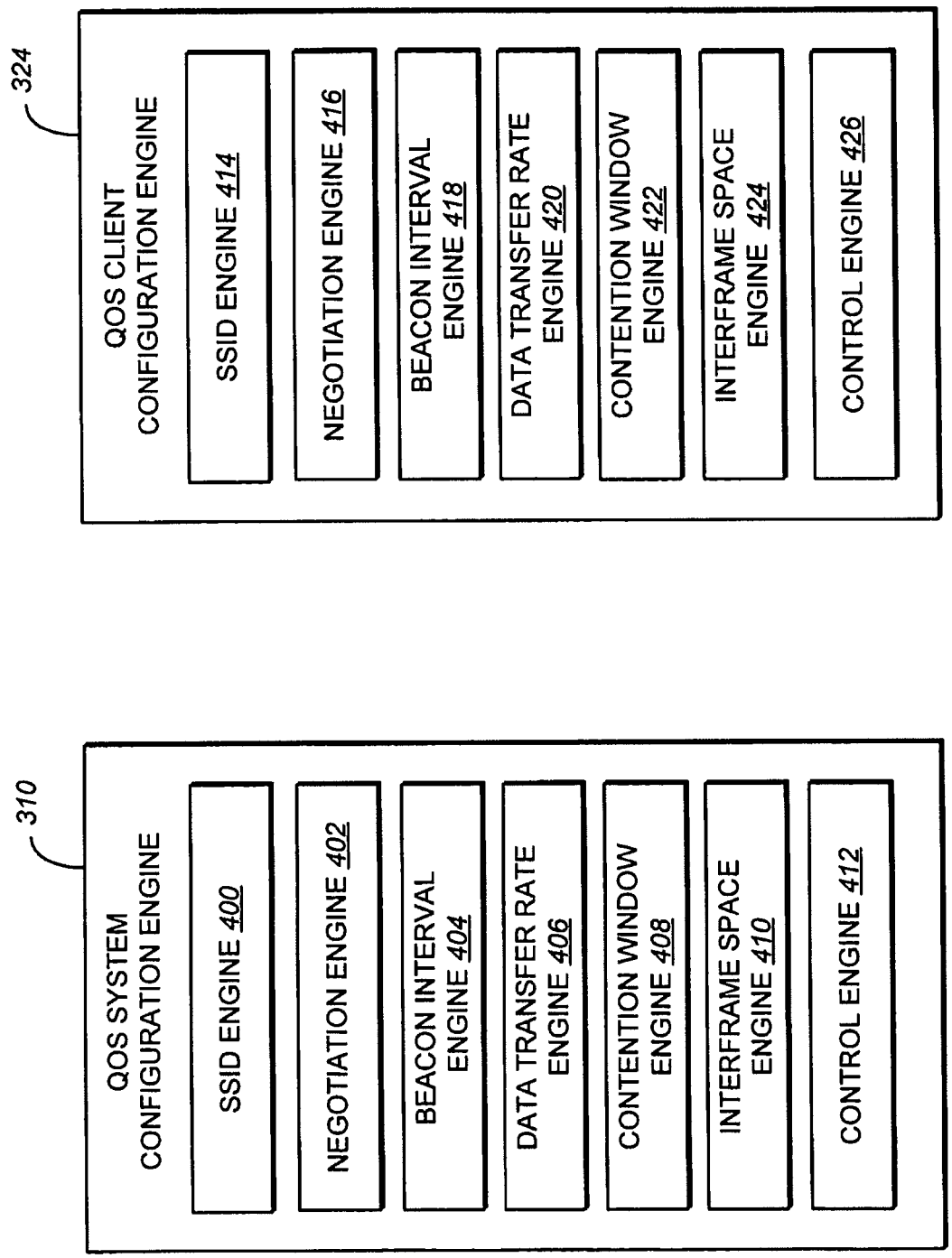

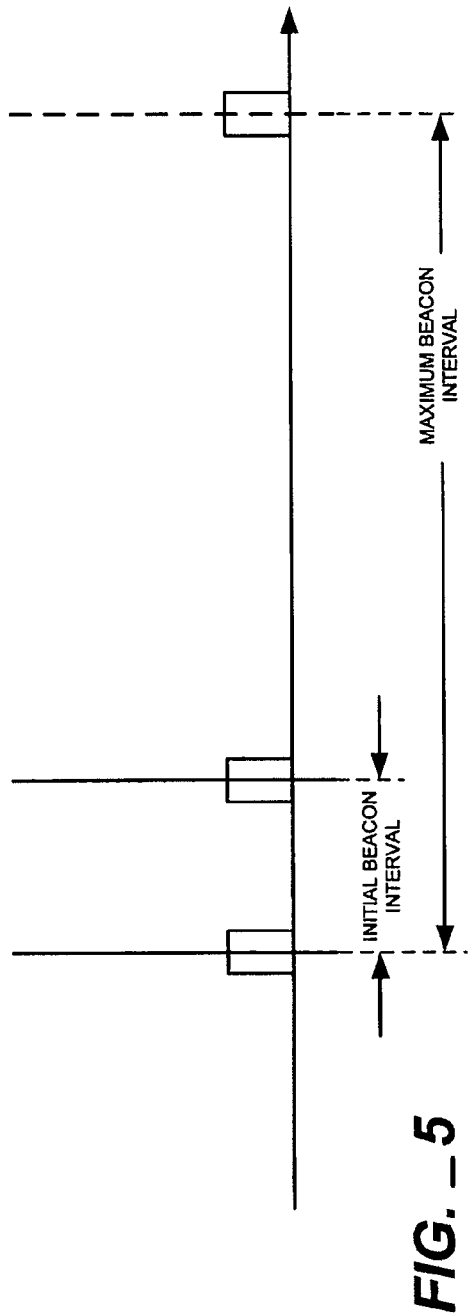
FIG._5
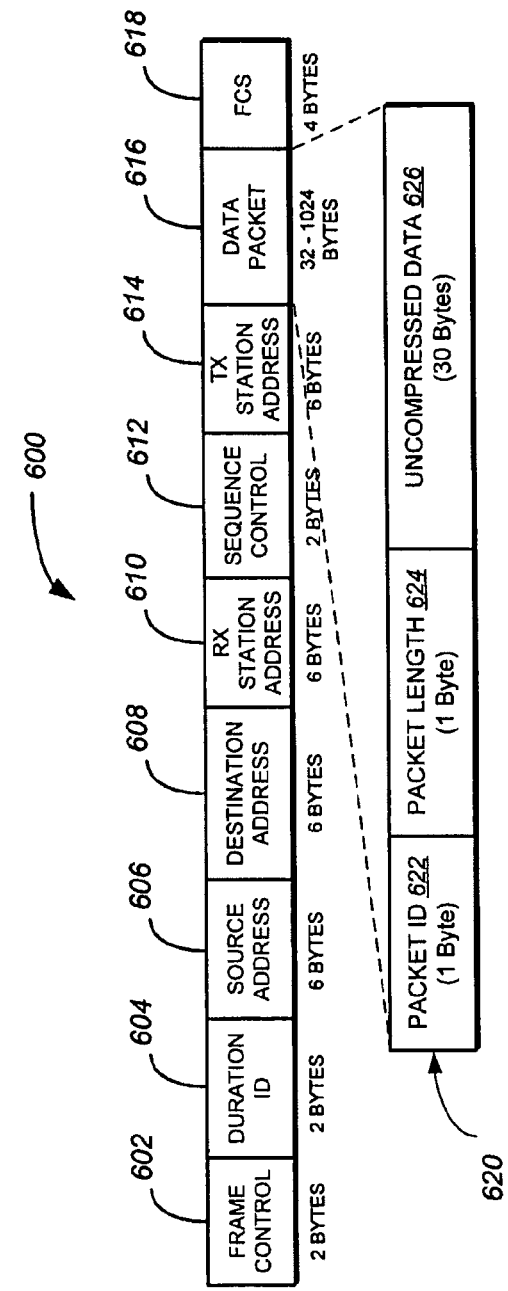
FIG._6

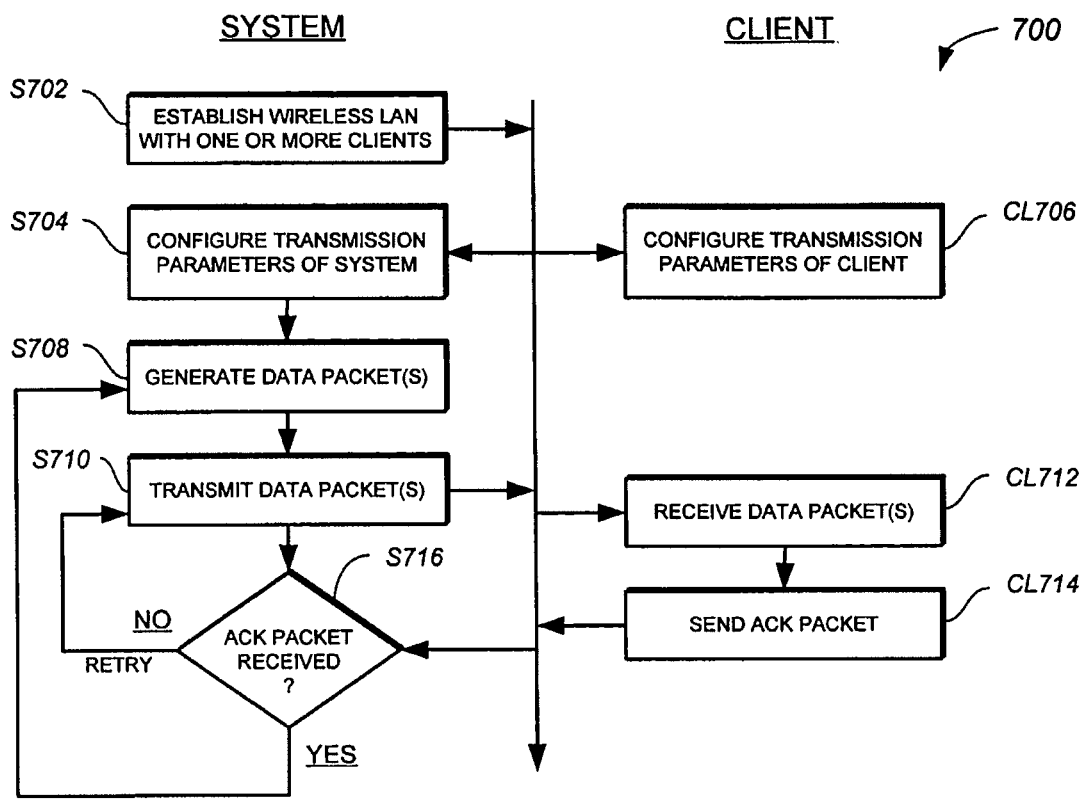
FIG. _7

ACKNOWLEDGING RECEIPT OF REAL-TIME DATA

CROSS-REFERENCE TO RELATED APPLICATIONS

The present application is a divisional of and claims the benefit of the priority to U.S. patent application Ser. No. 10/960,378, filed Oct. 6, 2004, and issued on Jul. 7, 2009, as U.S. Pat. No. 7,558,289, which claims the benefit of priority to commonly assigned U.S. Provisional Application Ser. No. 60/581,040, filed Jun. 17, 2004, the disclosures of which are incorporated herein by reference in their entirety.

BACKGROUND

This disclosure relates to network devices and network communication.

Wireless local area networks (WLANs) are increasingly being used in many different applications, e.g., in home entertainment and business applications.

In one application of a conventional WLAN, one or more wireless clients (e.g., telephone, speaker, television, projector, and so on) can be configured to be in communication with one or more wireless communication systems (e.g., a server, a network, a desktop workstation, laptop computer, and so on) to receive and transmit information.

WLANs generally specify the technologies for wireless communication. Example WLANs can be implemented according to one or more of the following standards: IEEE standards 802.11, 802.11a, 802.11b, 802.11g, 802.11n, 802.16 and 802.20. WLANs typically implement-one or more communication protocols in which information is transmitted in packets. Such communication protocols can specify features such as packet size, packet content information, data rates, roaming, and so on. WLANs generally include a communication medium (or transmission channel) that is shared by transmitters (e.g., a wireless communication system and one or more wireless clients). To avoid collision between two transmitted packets on the shared communication medium, a WLAN can implement a CSMA/CA (carrier sense multiple access with collision avoidance) protocol.

FIG. 1 illustrates a timing sequence 100 for transmission of a packet according to a CSMA/CA protocol. When a wireless communication system wants to transmit a packet (e.g., to a wireless client), the wireless communication system first senses (or listens to) the shared communication medium to determine whether the shared communication medium is free (or idle). If the shared communication medium is sensed by the wireless communication system as being free, the wireless communication system waits for a DCF (Distributed Coordination Function) interframe space (DIFS), and then transmits a packet. Otherwise, the wireless communication system defers access to the shared communication medium until the shared communication medium is free, and the wireless communication system commences a backoff procedure. The backoff procedure reflects a delay of a number of random timing slots. The random delay occurs during a contention window so that the likelihood of collision between transmitted packets on the shared communication medium is reduced. Thereafter, the wireless communication system again senses the shared communication medium. If the shared communication medium is free, the wireless communication system transmits a next packet on the shared communication medium.

Within the CSMA/CA protocol, each wireless client is also operable to send an acknowledgement (ACK) packet each time the wireless client correctly receives a packet. ACK packets are typically sent after a short interframe space (SIFS) as shown in FIG. 1.

With respect to transmission of real-time data (e.g., streaming audio, video, and so on) in a conventional WLAN, a wireless communication system can send compressed real-time data through multicast network services to one or more wireless clients using standard protocols such as TCP/IP (Transmission Control Protocol/Internet Protocol) and RTP (Real-Time Transport Protocol). Although RTP provides end-to-end network transport functions suitable for transmission of real-time data in a WLAN, RTP typically does not provide QoS (Quality of Service)—e.g., RTP does not require that a wireless client return an ACK packet.

SUMMARY

In general, in one aspect, this specification describes a wireless communication system. The wireless communication system includes a memory buffer operable to provide one or more real-time data packets to be transmitted from a wireless communication system to (N) wireless clients in a WLAN. Each real-time data packet contains real-time data in an uncompressed format, and (N) is an integer greater than (0). The wireless communication system further includes a transceiver operable to transmit the one or more real-time data packets from the wireless communication system to the (N) wireless clients.

Particular implementations can include one or more of the following features. The transceiver can unicast the one or more real-time data packets to the (N) wireless clients. One or more of the real-time data packets can not contain TCP/IP headers. The wireless communication system can further include a control engine operable to configure one or more transmission parameters associated with the wireless communication system to support a real-time transmission mode. The real-time transmission mode can be characterized by a configuration that permits the wireless communication system and the one or more of the (N) wireless clients to transmit real-time data packets not containing TCP/IP headers. The control engine can configure one or more transmission parameters including a beacon interval, a data transfer rate, a contention window size, or an interframe spacing window.

The control engine can control a beacon interval engine, a data rate transfer engine, a contention window engine, and an interframe space engine associated with the wireless communication system. The beacon interval engine can change a beacon interval from an initial beacon interval to a pre-determined beacon interval different from the initial beacon interval after the (N) wireless clients have been associated with the wireless communication system in the WLAN. The data rate transfer engine can set a data transfer rate of a corresponding media access controller (MAC) at a fixed rate (e.g., 11 Mbps). The contention window engine can set a contention window size parameter of a corresponding MAC to a value CWmin (minimum contention window). The interframe space engine can set an interframe spacing parameter of a corresponding MAC to a minimum size. The transceiver can receive the one or more real-time data packets in accordance with one or more of the following IEEE wireless communication protocols: 802.11, 802.11a, 802.11b, 802.11g, 802.11n, 802.16 and 802.20.

In general, in another aspect, this specification describes a wireless client. The wireless client includes a SSID (Service Set IDentifier) engine operable to associate a wireless client with a wireless communication system in a WLAN, and a transceiver operable to receive one or more real-time data packets transmitted from the wireless communication system. Each real-time data packet contains real-time data in an uncompressed format. The wireless client further includes a negotiation engine operable to send an acknowledgement (ACK) packet for each real-time data packet correctly received by the wireless client.

Particular implementations can include one or more of the following features. The SSID engine can sniff a SSID associated with the WLAN. The wireless client can further include a control engine operable to configure one or more transmission parameters associated with the wireless client to support a real-time transmission mode. The control engine can configure one or more transmission parameters including a beacon interval, a data transfer rate, a contention window size, or an interframe spacing window.

The control engine can control a beacon interval engine, a data rate transfer engine, a contention window engine, and an interframe space engine. The beacon interval engine can change a beacon interval from an initial beacon interval to a pre-determined beacon interval different from the initial beacon interval after the wireless client has been associated with the wireless communication system. The data rate transfer engine can set a data transfer rate of a corresponding MAC at a fixed rate. The contention window engine can set a contention window size parameter of a corresponding MAC to a value CWmin. The interframe space engine can set an interframe spacing parameter of a corresponding MAC to a minimum size. The transceiver can receive one or more real-time data packets unicast from the wireless communication system. The transceiver can transmit the one or more real-time data packets in accordance with one or more of the following IEEE wireless communication protocols: 802.11, 802.11a, 802.11b, 802.11g, 802.11n, 802.16 and 802.20.

In general, in another aspect, this specification describes a real-time data packet. The real-time data packet includes a destination address field indicating a destination address for the real-time data packet, a source address field indicating a source address associated with the real-time data packet, a transmitting station address field indicating an address of a transmitting station, a receiving station address field indicating an address of a receiving station, and a data packet field containing one or more blocks. Each block includes a packet length field identifying a total length of a given block, a data field containing real-time data in an uncompressed format, and a packet ID field identifying a type of data contained in data field.

Particular implementations can include one or more of the following features. The real-time data packet can further include a frame control field indicating a protocol version associated with the real-time data packet, a duration ID field indicating a duration of the real-time data packet or indicating an address of the transmitting station, a sequence control field indicating an order of fields within the real-time data packet, and a frame check sequence field indicating a frame check sequence associated with the real-time data packet.

The destination address field can be (6) bytes in size, the source address field can be (6) bytes in size, the transmitting station address field can be (6) bytes in size, the receiving station address field can be (6) bytes in size, the packet ID field can be (1) byte in size, the packet length field can be (1) byte in size, and the data field can have a maximum size of (30) bytes. The real-time data packet can be composed of (16) or (32) blocks for a total size of (512) bytes or (1024) bytes of uncompressed real-time data.

Implementations can include one or more of the following advantages. QoS is provided in the transmission of real-time data (e.g., streaming audio, video, and so on) over a WLAN. The real-time data is sent within a data packet in an uncompressed format. Thus, compression/de-compression circuitry is not necessary, reducing the cost and complexity of WLAN systems that transmit real-time data. In one implementation, delays in transmission of audio data packets from a wireless communication system to a wireless client is substantially unperceivable—i.e., a worst case delay for transmission of an audio packet is not greater than approximately 10 ms (microseconds).

Other features and advantages are apparent from the following description, and from the claims.

DESCRIPTION OF DRAWINGS

FIG. 1 illustrates a timing sequence for transmission of a packet according to the CSMA/CA (carrier sense multiple access with collision avoidance) protocol.

FIG. 2 is a block diagram of a WLAN.

FIG. 3A and 4A are block diagrams of a wireless communication system.

FIG. 3B and 4B are block diagrams of a wireless client.

FIG. 5 illustrates a beacon interval.

FIG. 6 illustrates a real-time data packet.

FIG. 7 is a method for transmitting real-time data in the WLAN of FIG. 2.

Like reference symbols in the various drawings indicate like elements.

DETAILED DESCRIPTION

FIG. 2 is a block diagram of a wireless local area network (WLAN) 200. WLAN 200 includes a wireless communication system 202 and wireless clients 204-208. Though three wireless clients 204-208 are illustrated in FIG. 2 by way of example, WLAN 200 can contain a different number of wireless clients. WLAN 200 can be arranged according to an ad-hoc mode in which wireless communication system 202 communicates directly with each of wireless clients 204-208 without an access point. In one implementation, one or more of IEEE standards 802.11a, 802.11b and 802.11g specify the technologies for wireless communications in WLAN 200. IEEE standards 802.11, 802.11n, 802.16 and 802.20 can also specify the technologies for wireless communications in WLAN 200.

Wireless communication system 202 can be any type of system operable to generate or process real-time data. For example, wireless communication system 202 can be a server, a network, a desktop workstation, laptop computer, hand-held personal computer, personal digital assistant (PDA), cellular telephone, data collector, and so on. In one implementation, at least one of wireless clients 204-208 includes a device operable to output streaming audio or video, e.g., a telephone, speaker, television, projector, and so on. Streaming audio or video is typically transmitted as a stream (of packets) that flows at a constant bit rate—i.e., a wireless client outputs audio or video playback at a rate at which the wireless client receives the audio or video stream. Each wireless client 204-208 can have different communication capabilities and requirements.

Referring to FIG. 3A, wireless communication system 202 includes a host device 300, a real-time data source 302, an analog-to-digital converter 304 (optional), a memory buffer 306, a media access controller (MAC) 308, a baseband processor 312 and a radio frequency (RF) transceiver 314. Real-time data source 302 outputs real-time data either in analog or digital format. The real-time data can include any type of real-time data—e.g., streaming video or audio. In one implementation, real-time data source 302 outputs real-time data in analog format to ADC 304. Alternatively, real-time data source 302 can output real-time data in digital format directly to memory buffer 306. ADC 304 is operable to convert analog data into digital data. Memory buffer 306 buffers received digital data and provides data packets to MAC 308. In one implementation, memory buffer 306 is a dual buffer operable to output a data packet from a first buffer while receiving digital data at a second buffer.

MAC 308 includes one or more processing engines for processing received/and to be transmitted data packets and interfacing with network components. MAC 308 includes QoS system configuration engine 310 for configuring transmission parameters of wireless communication system 202. The transmission parameters control when and how data packets are transmitted to a wireless client (e.g., wireless clients 204-208). In one implementation, the transmission parameters include media access parameters—e.g., contention window size, interframe space size, retry count threshold, beacon interval, and so on. QoS system configuration engine 310 can be in the form of hardware (circuits), software, firmware or combinations thereof. MAC 308 also provides an interface to baseband processor 312. Baseband processor 312 processes baseband signals from/to RF signals in conformance with a conventional radio frequency transmission protocol. RF transceiver 300 transmits and receives packets to/from each of wireless clients 204-208 (FIG. 2).

FIG. 4A shows QoS system configuration engine 310 in greater detail. QoS system configuration engine 310 includes a SSID (Service Set IDentifier) engine 400, a negotiation engine 402, a beacon interval engine 404, a data transfer rate engine 406, a contention window engine 408, an interframe space engine 410 and a control engine 412.

A SSID is a token that identifies a particular WLAN. Typically, the SSID is a secret key that can be pre-set or programmed by a network administrator. Typically, the SSID must be known in order for a system or wireless client to join a given WLAN (e.g., WLAN 200 of FIG. 2). Alternatively, the SSID can be discovered by network sniffing. The SSID can be a part of a packet header for every packet sent over WLAN 200 (FIG. 2). SSID engine 400 is operable to set or generate a SSID for wireless communication system 202. SSID engine 400 can include one or more routines for producing SSIDs, using for example, a PIN generated by a pin generator (not shown). Alternatively, SSID engine 400 can generate a SSID based on user input, e.g., through a keyboard or other input device.

Negotiation engine 402 is operable to establish a WLAN, including associating one or more wireless clients (e.g., wireless clients 204-208 of FIG. 2) with a wireless communication system (e.g., wireless communication system 200 of FIG. 2). In one implementation, negotiation engine 402 broadcasts a conventional beacon packet to all wireless clients in a WLAN. In one implementation, the beacon packet is approximately fifty bytes long, with substantially half of the beacon packet comprising a common frame header and a cyclic redundancy checking (CRC) field. The frame header includes source and destination MAC addresses as well as other information regarding the communications process. The CRC field provides error detection capability. Negotiation engine 402 is also operable to determine whether an ACK packet has been received from a wireless client after transmission of a corresponding data packet.

Beacon interval engine 404 is operable to dynamically change (e.g., increase or decrease) a beacon interval of wireless communication system 200 once a WLAN has been established by negotiation engine 402. The beacon interval represents an amount of time between beacon packet transmissions. In one implementation, an initial beacon interval (e.g., 100 ms) is dynamically changed to a maximum beacon interval (e.g., 60 sec) after a WLAN has been established, as shown in FIG. 5. Increasing the beacon interval reduces the amount of beacon packets broadcast by wireless communication system 202 and reduces the associated overhead.

Referring again to FIG. 4A, QoS system configuration engine 310 further includes a data transfer rate engine 406. Data transfer rate engine 406 is operable to set a data transfer rate parameter of MAC 308 at a fixed, pre-determined data transmission rate, such that rate adaptation does not occur. In one implementation, data transfer rate engine 406 fixes the data transmission rate parameter of MAC 308 at a pre-determined level (e.g., 11 Mbps (megabits per second)). In one implementation, data transfer rate engine 406 permits rate adaptation to occur at data transmission rates above a pre-determined level (e.g., 11 Mbps in an 802.11g WLAN).

Contention window engine 408 is operable to set a contention window size parameter associated with MAC 308. In one implementation, contention window engine 408 sets the contention window parameter to a value CWmin (the minimum contention window).

Interframe space engine 410 is operable to set an interframe spacing window parameter associated with MAC 308. In one implementation, interframe space engine 410 sets the interframe spacing window to a minimum size—e.g., (0).

Control engine 412 is operable to switch operation of MAC 308 between at least two modes—a normal transmission mode and a real-time data transmission mode. In the normal data transmission mode, control engine 412 maintains transmission parameters of MAC 408 according to values as necessary for the transmission of conventional Internet Protocol (IP) packets. Conventional IP packets contain protocols and data from higher layers within an IP network stack. For example, a conventional IP data packet can include HTML code from a Web page (complete with TCP/IP headers) that a user is viewing.

In the real-time transmission mode, control engine 412 is operable to control each of beacon interval engine 404, data transfer rate engine 406, contention window engine 408 and interframe space engine 410 so that transmission parameters of MAC 308 permit transmission of real-time data packets (discussed in greater detail below). Unlike a conventional IP packet that includes data from higher layers within an IP stack (e.g., TCP/IP headers), real-time data packets, in one implementation, do not include data from higher layers within an IP stack (e.g., the real-time data packets do not include TCP/IP headers).

FIG. 6 shows a real-time data packet 600. In one implementation, real-time data packet 600 includes a MAC header portion that allocates (2) bytes for frame control 602, (2) bytes for duration/ID 604, (6) bytes for a destination address 606, (6) bytes for a source address 608, (6) bytes for an address of a receiving station (e.g., a wireless client) 610, (2) bytes for sequence control 612, and (6) bytes for an address of a transmitting station (e.g., a wireless client) 614. Real-time data packet 600 also includes a data packet field 616 (variable in size) (discussed in greater detail below). A 4-byte frame check sequence (FCS) 618 follows data packet field 616.

Data packet field 616 contains one or more of blocks 620. Block 620 includes a packet ID field 622, a packet length field 624 and a data field 626. Packet ID field 622 identifies a type of data contained in data field 626. Types of data include streaming video, audio, management commands, and other types of data that can be assigned an identifier. In one implementation, packet ID field 622 has a size of (1) byte. Packet length field 624 identifies a total length of block 620. In one implementation, packet length field 624 has a size of (1) byte. In one implementation, data field 626 includes real-time data (e.g., streaming video or audio). In one implementation, the real-time data is uncompressed. In one implementation, data field 626 has a maximum size of (30) bytes.

In one implementation, memory buffer 306 buffers (32) blocks 620 within data packet field 616 to form a single real-time data packet having (1024) bytes of uncompressed real-time data. In another implementation, memory buffer 306 buffers (16) blocks 620 to form a single real-time data packet having (512) bytes of uncompressed real-time data.

Referring to FIG. 3B, wireless client 204 includes a client 316, a digital-to-analog converter (DAC) 318, a buffer memory 320, a MAC 322, a baseband processor 326 and an RF transceiver 328. In one implementation, RF transceiver 328 transmits and receives packets to/from one or more wireless clients (e.g., wireless clients 204-208 of FIG. 2). Baseband processor 326 processes the RF signals from/to baseband in conformance with a conventional radio frequency transmission protocol. MAC 322 includes one or more processing engines for processing received/and to be transmitted signals and interfacing with network components. MAC 322 also provides a network interface to buffer memory 320. Memory buffer 320 buffers received data packets and outputs digital data to DAC 318. In one implementation, memory buffer 320 is a dual buffer operable to receive a data packet in a first buffer while sending digital data (to DAC 318) from a second buffer. DAC 318 converts digital data into analog data, which is sent to client 316. In one implementation, memory buffer outputs digital data directly to client 316 (not shown) (i.e., DAC 318 is not required).

MAC 322 includes QoS client configuration engine 324 for configuring transmission parameters of wireless client 204. The transmission parameters control when and how packets are received/sent by wireless client 204. As discussed above, the transmission parameters can include media access parameters—e.g., contention window size, interframe space size, retry count threshold, beacon interval, and so on. QoS client configuration engine 324 can be in the form of hardware (circuits), software, firmware or combinations thereof.

In one implementation, the transmission parameters of a wireless communication system (e.g., wireless communication system 202) and one or more wireless clients (e.g., wireless clients 204-208) are configured such that ACK times of configured wireless client are kept at or below a pre-determined threshold to permit a wireless communication system to perform a pre-determined number of retries during transmission of data packets to a wireless client. In one implementation, wireless communication system 202 does not wait before re-transmitting a packet that has been corrupted at a given wireless client. Generally, a larger retry threshold count (e.g., 3 or more) statistically allows for a packet throughput of nearly 100 percent.

QoS system configuration engine 310 and QoS client configuration engine 324 generally provides a pre-determined level of QoS for supporting communication (including real-time data) in WLAN 200. QoS is a term for characterizing a performance of packet flow and can be measured by, inter alia, packet transfer delay, jitter, probability of packet loss and throughput.

Referring to FIG. 4B, QoS client configuration engine 324 is shown in greater detail. QoS client configuration engine 324 includes a SSID engine 414, a negotiation engine 416, a beacon interval engine 418, a data transfer rate engine 420, a contention window engine 422, an interframe space engine 424 and a control engine 426.

SSID engine 414 is operable to set, or generate, a SSID for wireless client 204. In one implementation, SSID engine generates (or detects) and stores the SSID associated with a given WLAN. The SSID used by wireless client 204 must match the SSID of wireless communication system 202. The SSID can be pre-set or pre-programmed by a network administrator through SSID engine 414.

Negotiation engine 416 is operable to join a WLAN with wireless communication system 200 (FIG. 2). In one implementation, negotiation engine 416 broadcasts a conventional beacon packet to wireless communication system 200. Negotiation engine 416 is also operable to send an ACK packet to wireless communication system 200 after receiving a corresponding data packet from wireless communication system 200.

Beacon interval engine 418 is operable to dynamically change a beacon interval of wireless client 204 once a WLAN has been established by negotiation engine 416. In one implementation, an initial beacon interval (e.g., 100 ms) is dynamically changed to a maximum beacon interval (e.g., 60 sec) after a WLAN has been established.

Data transfer rate engine 420 is operable to set a data transfer rate parameter of MAC 322 at a fixed, pre-determined data transmission rate. In one implementation, data transfer rate engine 420 fixes the data transmission rate parameter of MAC 322 at a pre-determined level (e.g., 11 Mbps). In one implementation, data transfer rate engine 422 permits rate adaptation to occur at data transmission rates above a pre-determined level (e.g., 11 Mbps).

Contention window engine 422 is operable to set a contention window size parameter associated with MAC 322. In one implementation, contention window engine 422 sets the contention window parameter of MAC 322 to a value CWmin.

Interframe space engine 424 is operable to set an interframe spacing window parameter associated with MAC 322. In one implementation, interframe space engine 424 sets the interframe spacing window of MAC 322 to a minimum size—e.g., (0).

Control engine 426 is operable to switch operation of MAC 322 between at least two modes - a normal transmission mode and a real-time data transmission mode, as discussed above.

Referring to FIGS. 3A and 3B, in one implementation of a real-time transmission mode of operation, real-time data source 302 provides real-time data in an analog format to ADC 304. ADC 304 converts the real-time data into digital format and outputs the digital data to memory buffer 306. In one implementation, ADC 304 interleaves digital data (e.g., 2-channel audio data) into memory buffer 306. Buffer memory 306 configures the digital data into one or more real-time data packets (including uncompressed data) and sends the real-time data packets to MAC 308. In one implementation, the real-time data packets sent to MAC 308 do not include data from higher layers within an IP stack (e.g., TCP/IP headers). MAC 308 processes the real-time data packets according to transmission parameters associated with the real-time transmission mode and sends the real-time data packets to baseband processor 312 and RF transceiver 314 for transmission (e.g., unicast) of the real-time data packets to wireless client 204.

RF transceiver 328 of wireless client 204 receives the real-time data packets and sends an ACK packet back to wireless communication system 202, acknowledging receipt of each real-time data packet. Baseband processor 326 processes the real-time data packets in RF format to baseband in conformance with a conventional radio frequency transmission protocol. MAC 322 includes one or more processing engines for processing the received real-time data packets in accordance with one or more transmission parameters associated with the real-time transmission mode. Memory buffer 320 buffers the received real-time data packets and outputs digital data to DAC 318. DAC 318 converts digital data into analog data, which is sent to client 316.

Table 1 below shows example transmission rates and transmission parameter values associated with transmitting audio data packets to a single receiver and two receivers, respectively.

TABLE 1

| Unicast Audio Transmission | One receiver | Two receivers |
|---|---|---|
| Sample Rate | 48 KHz | 48 KHz |
| Resolution | 16 bits | 16 bits |
| Channels per receiver | 2 | 1 |
| Data Rate | 1.536 Mbps | 0.768 Mbps |
| Audio Packet Size | 1024 | 512 |
| Amount of Audio per channel in a single packet (APC) | 5.33 ms | 5.33 ms |
| Number of packets to transfer (NPT) | 1 | 2 |
| Time to transfer 1 packet over air (TT) | 0.8 ms | 0.43 ms |
| Amount of time from NACK to re-try (NR) | 0.2 ms | 0.2 ms |
| Retry count threshold (max) | 5 | 4 |
| Data transfer rate | 11 Mbps | 11 Mbps |
| Worst case delay | 10.33 ms | 10.35 ms |

As shown in Table 1, a maximum number of 5 retries is possible when transmitting an audio data packet (uncompressed) to a single receiver, and a maximum number of 4 retries is possible when transmitting an audio data packet (uncompressed) to two receivers. In one implementation, the retry count threshold is determined based on the following equation:

$$\frac{APC}{((TT)(NPT)) + (NR)} \quad (e.q.\ 1)$$

where APC represents the amount of audio per channel in a single packet, TT represents the time to transfer a single packet over the air, NPT represents the total number of packets to transfer and NR represents an amount of time from NACK (No ACK) to re-transmission of the audio packet.

FIG. 7 shows a method 700 for transmitting uncompressed, real-time data according to a pre-determined level of QoS in a WLAN (e.g., WLAN 200). Referring to FIGS. 2, 3A, 3B, 4A, 4B, 6, and 7, a wireless communication system (e.g., wireless communication system 202) establishes a WLAN with one or more wireless clients (e.g., wireless client 204-208) (step S702). In one implementation, a negotiation engine (e.g., negotiation engine 402) broadcasts a conventional beacon packet to the one or more wireless clients. A negotiation engine associated with each of the wireless clients (e.g., negotiation engine 416) responds to the beacon packet by broadcasting a second beacon packet to the wireless communication system, thus establishing a WLAN between the wireless communication system and a given wireless client.

Transmission parameters of the wireless communication system are configured (step S704). In one implementation, the transmission parameters of the wireless communication system are configured in response to a control engine (e.g., control engine 412) switching a mode of operation of a MAC (e.g., MAC 308) to a real-time transmission mode.

In the real-time transmission mode, one or more of transmission parameters of the wireless communication system are configured as follows. A beacon interval engine (e.g., beacon interval engine 404) dynamically changes a beacon interval of the wireless communication system from an initial beacon interval (e.g., 100 ms) to a maximum beacon interval (e.g., 60 sec). A data transfer rate engine (e.g., data transfer rate engine 406) sets a data transfer rate parameter of the MAC at a fixed, pre-determined data transmission rate (e.g., 11 Mbps), such that rate adaptation does not occur. In one implementation, the data transfer rate engine permits rate adaptation to occur at data transmission rates above a pre-determined level (e.g., 11 Mbps in an 802.11g WLAN). A contention window engine (e.g., contention window engine 408) sets a contention window size parameter to a value CWmin (the minimum contention window). An interframe space engine (e.g., interframe space engine 410) sets an interframe spacing window parameter associated with the MAC to a minimum size—e.g., (0). All, or combinations of, the settings above can be used to configure the transmission parameters of wireless communication system during the real-time transmission mode.

Thereafter, the transmission parameters of the wireless clients are configured (step CL706). In one implementation, the transmission parameters of the wireless clients are configured in response to a corresponding control engine (e.g., control engine 426) switching a mode of operation of a corresponding MAC (e.g., MAC 322) to a real-time transmission mode.

In the real-time transmission mode, one or more of transmission parameters of the wireless clients are configured similarly as the wireless communication system. That is, in one implementation, a beacon interval engine associated with each wireless client dynamically changes a beacon interval of a corresponding wireless client from an initial beacon interval (e.g., 100 ms) to a maximum beacon interval (e.g., 60 sec). A data transfer rate engine associated with each wireless client sets a data transfer rate parameter of corresponding MACs at a fixed, pre-determined data transmission rate (e.g., 11 Mbps). In one implementation, the data transfer rate engine associated with each wireless client permits rate adaptation to occur at data transmission rates above a pre-determined level (e.g., 11 Mbps in an 802.11g WLAN). A contention window engine associated with each wireless client sets a contention window size parameter to a value CWmin (the minimum contention window). An interframe space engine associated with each wireless client sets an interframe spacing window parameter associated with corresponding MACs to a minimum size—e.g., (0). All, or combinations of, the settings above can be used to configure the transmission parameters of wireless clients during real-time transmission mode.

The wireless communication system generates real-time data packets (step S708). In one implementation, real-time data packets include a packet ID field (e.g., packet ID field 622), a packet length field (e.g., packet length field 624) and a data field (e.g., data field 626) (e.g., containing uncompressed real-time audio or video data). The real-time data packets can be generated by buffering digital data into packets of a pre-determined size within a memory buffer (e.g., memory buffer 306). In one implementation, the real-time data packets do not include data from higher layers within an IP stack (e.g., TCP/IP headers).

The wireless communication system transmits one or more real-time data packets to the wireless clients (step S710). The real-time data packets are transmitted to the wireless clients having (e.g., uncompressed) real-time data. Each of the wireless clients receives one or more real-time data packets from the wireless communication system (step CL712), and sends an ACK packet to the wireless communication system acknowledging receipt of a real-time data packet (step CL714). The wireless communication system determines whether an ACK packet was received in response to sending a corresponding real-time data packet (step S716). If an ACK packet was not received, the wireless communication system re-tries transmission of the data packet, until an ACK is received, or the retry threshold count is exceeded. If an ACK was received by the wireless communication system, then the wireless communication system transmits a next real-time data packet.

A number of implementations have been described. Nevertheless, it will be understood that various modifications may be made. Though the various engines and components have been described above as separate, plural components can be combined in singular circuitry, engines, programs or the like. The methods described may be implemented in embedded systems, hardware, firmware, software, or combinations thereof, or in a computer program product tangibly embodied in a computer readable storage device. Storage devices suitable for tangibly embodying the computer program include all forms of non-volatile memory including semiconductor memory devices. Accordingly, other implementations are within the scope of the following claims.

We claim:

1. A method for communicating with a wireless communication system through a wireless client, the method comprising:
    associating a wireless client with a wireless communication system;
    configuring the wireless client to switch from operating in a first transmission mode to a second transmission mode, wherein the first transmission mode includes receiving packets comprising header information in accordance with a communication protocol specified for the first transmission mode, and the second transmission mode includes receiving real-time data packets that do not contain the header information in accordance with the communication protocol specified for the first transmission mode;
    at the wireless client operating in the second transmission mode, receiving one or more real-time data packets transmitted from the wireless communication system, each real-time data packet containing real-time data in an uncompressed format; and
    sending an acknowledgement (ACK) packet for each real-time data packet correctly received by the wireless client.

2. The method of claim 1, wherein associating the wireless client with the wireless communication system includes sniffing a SSID associated with a WLAN.

3. The method of claim 1, further comprising configuring one or more transmission parameters associated with the wireless client to support the second transmission mode for receiving the one or more real-time data packets from the wireless communication system, the second transmission mode being characterized by a configuration that permits the wireless client to receive real-time data packets that do not contain TCP/IP headers.

4. The method of claim 3, wherein configuring one or more transmission parameters associated with the wireless client includes configuring one or more of a beacon interval, a data transfer rate, a contention window size, or an interframe spacing window.

5. The method of claim 3, wherein configuring one or more transmission parameters associated with the wireless client includes changing a beacon interval from an initial beacon interval to a pre-determined beacon interval different from the initial beacon interval after the wireless client has been associated with the wireless communication system.

6. The method of claim 3, wherein configuring one or more transmission parameters associated with the wireless client includes setting a data transfer rate of a MAC associated with the wireless client at a fixed rate.

7. The method of claim 3, wherein configuring one or more transmission parameters associated with the wireless client includes setting a contention window size parameter of a MAC associated with the wireless client to a value CWmin (minimum contention window).

8. The method of claim 3, wherein configuring one or more transmission parameters associated with the wireless client includes setting an interframe spacing parameter of a MAC associated with the wireless client to a minimum size.

9. The method of claim 1, wherein receiving one or more real-time data packets transmitted from the wireless communication system includes receiving one or more real-time data packets transmitted unicast from the wireless communication system.

10. A wireless client comprising:
    a SSID (Service Set Identifier) engine operable to associate a wireless client with a wireless communication system;
    a control engine operable to configure the wireless client to switch from operating in a first transmission mode to a second transmission mode, wherein the first transmission mode includes receiving packets comprising header information in accordance with a communication protocol specified for the first transmission mode, and the second transmission mode includes receiving real-time data packets that do not contain the header information in accordance with the communication protocol specified for the first transmission mode;
    a transceiver operating in the second transmission mode, the transceiver operable to receive one or more real-time data packets transmitted from the wireless communication system, each real-time data packet containing real-time data in an uncompressed format; and
    a negotiation engine operable to send an acknowledgement (ACK) packet for each real-time data packet correctly received by the wireless client.

11. The wireless client of claim 10, wherein the SSID engine is operable to sniff a SSID associated with a WLAN.

12. The wireless client of claim 10, wherein the control engine is operable to configure one or more transmission parameters associated with the wireless client to support the second transmission mode, the second transmission mode being characterized by a configuration that permits the wireless client to receive real-time data packets not containing TCP/IP headers.

13. The wireless client of claim 12, wherein the control engine is operable to control a data rate transfer engine associated with the wireless client, the data rate transfer engine operable to set a data transfer rate of a corresponding MAC at a fixed rate.

14. The wireless client of claim 12, wherein the control engine is operable to control a contention window engine associated with the wireless client, the contention window engine operable to set a contention window size parameter of a corresponding MAC to a value CWmin (minimum contention window).

15. The wireless client of claim 12, wherein the control engine is operable to control an interframe space engine associated with the wireless client, the interframe space engine operable to set an interframe spacing parameter of a corresponding MAC to a minimum size.

16. The wireless client of claim 12, wherein the control engine is operable to configure one or more transmission parameters including a beacon interval, a data transfer rate, a contention window size, or an interframe spacing window.

17. The wireless client of claim 12, wherein the control engine is operable to control a beacon interval engine associated with the wireless client, the beacon interval engine operable to change a beacon interval from an initial beacon interval to a pre-determined beacon interval different from the initial beacon interval after the wireless client has been associated with the wireless communication system.

18. The wireless client of claim 10, wherein the transceiver is operable to receive one or more real-time data packets transmitted unicast from the wireless communication system.

19. The wireless client of claim 10, wherein the transceiver is operable to receive the one or more real-time data packets in accordance with one or more of the following IEEE wireless communication protocols: 802.11, 802.11a, 802.11b, 802.11g, 802.11n, 802.16 and 802.20.

20. A wireless client comprising:
SSID (Service Set Identifier) means for associating a wireless client with a wireless communication system;
control means operable to configure the wireless client to switch from operating in a first transmission mode to a second transmission mode, wherein the first transmission mode includes receiving packets comprising header information in accordance with a communication protocol specified for the first transmission mode, and the second transmission mode includes receiving real-time data packets that do not contain the header information in accordance with the communication protocol specified for the first transmission mode;
transceiver means operating in the second mode, the transceiver means for receiving one or more real-time data packets transmitted from the wireless communication system, each real-time data packet containing real-time data in an uncompressed format; and
negotiation means for sending an acknowledgement (ACK) packet for each real-time data packet correctly received by the wireless client.

\* \* \* \* \*